United States Patent
Aikawa et al.

(10) Patent No.: US 7,592,890 B2
(45) Date of Patent: Sep. 22, 2009

(54) MAGNETIC-PATH MEMBER, ELECTROMAGNETIC COUPLING DEVICE USING MAGNETIC-PATH MEMBER, AND METHOD OF MANUFACTURING MAGNETIC-PATH MEMBER

(75) Inventors: Masashi Aikawa, Tochigi (JP); Koji Iizuka, Sano (JP); Masayuki Sayama, Tochigi-ken (JP); Katsuyoshi Koike, Gyoda (JP)

(73) Assignee: GKN Driveline Torque Technology KK, Tochigi-Shi (JP)

( * ) Notice: Subject to any disclaimer, the term of this patent is extended or adjusted under 35 U.S.C. 154(b) by 478 days.

(21) Appl. No.: 11/315,089

(22) Filed: Dec. 21, 2005

(65) Prior Publication Data
US 2006/0144666 A1 Jul. 6, 2006

(30) Foreign Application Priority Data
Dec. 24, 2004 (JP) ............................ P2004-374512

(51) Int. Cl.
*F16D 69/00* (2006.01)
*H01F 3/00* (2006.01)
(52) U.S. Cl. .................... 335/296; 335/279; 335/281; 335/297; 192/84.1
(58) Field of Classification Search ......... 335/285–298; 192/18 B, 53.2, 54.4–56.43, 84.1–84.961, 192/222, 226; 310/78, 92–110
See application file for complete search history.

(56) References Cited

U.S. PATENT DOCUMENTS

| 3,324,982 | A | * | 6/1967 | Mason et al. | ............... 192/84.9 |
| 4,305,198 | A | | 12/1981 | Kanamaru et al. | |
| 4,718,529 | A | * | 1/1988 | Kroeger et al. | .......... 192/107 R |
| 5,735,375 | A | | 4/1998 | Booth et al. | |
| 5,870,818 | A | * | 2/1999 | Bisaga | ........................ 29/607 |

FOREIGN PATENT DOCUMENTS

| DE | 1922802 | 9/1965 |
| DE | 2911874 | 10/1979 |
| DE | 3722146 | 2/1988 |
| DE | 69423559 | 12/2000 |
| EP | 0756296 | 1/1997 |
| JP | 55145825 | 11/1980 |
| JP | 08152029 | 6/1996 |
| JP | 11-153157 | 6/1999 |

* cited by examiner

*Primary Examiner*—Ramon M Barrera
(74) *Attorney, Agent, or Firm*—Morrison & Foerster LLP (57) ABSTRACT

A magnetic-path member includes first and second magnetic portions positioned on inner and outer peripheral sides of the magnetic-path member respectively. The magnetic-path member includes a non-magnetic portion interposed between the first and second magnetic portions and coupling the first and second magnetic portions by heat sintering. Magnetic lines of force occurring from an electromagnet pass through the magnetic-path member.

4 Claims, 7 Drawing Sheets

MAGNETIC-PATH MEMBER, ELECTROMAGNETIC COUPLING DEVICE USING MAGNETIC-PATH MEMBER, AND METHOD OF MANUFACTURING MAGNETIC-PATH MEMBER

CROSS-REFERENCE TO RELATED APPLICATIONS

This application is based upon and claims the benefit of priority from Japanese Patent Application No. 2004-374512 filed on Dec. 24, 2004; the entire contents of which are incorporated herein by reference.

BACKGROUND OF THE INVENTION

The invention relates to a magnetic-path member through which magnetic lines of force produced by an electromagnet pass, an electromagnetic coupling device using the magnetic-path member, and a method of manufacturing the magnetic-path member.

Japanese Unexamined Patent Publication Laid-open No. Hei 11-153157 discloses a driving-force transmission device. In this driving-force transmission device, an electromagnet attracts an armature to engage a pilot clutch (friction clutch). The pilot clutch actuates a cam mechanism by the driving force of an engine that acts on the cam mechanism through the pilot clutch. The cam mechanism engages a main clutch mechanism under the thrust power thereof.

The magnetic lines of force from the electromagnet are applied from a magnetic rotor (rear housing) through the pilot clutch to the armature. The rotor is magnetically partitioned by a non-magnetic ring (annular portion), thus preventing short circuits between outgoing and returning magnetic lines of force. This ring is welded to the rotor by electron beam welding.

In electron beam welding performed in this driving-force transmission device, welding is performed along the entire perimeter of the ring, and therefore operating time becomes longer accordingly. This deteriorates the productivity thereof. Electron beam welding is tends to produce uneven welding. Variations in cutting which are caused by the uneven welding causes the shaping of the ring and the rotor to be difficult, thus varying the quality.

The invention provides an excellent-productivity, low-cost, and stable-quality magnetic-path member, an electromagnetic coupling device using this magnetic-path member, and a method of manufacturing the magnetic-path member.

SUMMARY OF THE INVENTION

The first aspect of the invention provides a magnetic-path member. The magnetic-path member includes first and second magnetic portions positioned on inner and outer peripheral sides of the magnetic-path member respectively. The magnetic-path member includes a non-magnetic portion interposed between the first and second magnetic portions and coupling the first and second magnetic portions by heat sintering. Magnetic lines of force occurring from an electromagnet pass through the magnetic-path member.

The non-magnetic portion prior to heat sintering includes a powdery non-magnetic material.

The non-magnetic member is recessed from radial surfaces at axial ends of the first and second magnetic portions.

The non-magnetic member after heat sintering has minute spaces therein.

The second aspect of the invention provides an electromagnet coupling device. The device includes a rotor for magnetic lines of force to pass therethrough. The device includes an electromagnet positioned on one side of the rotor. The device includes an armature positioned on the opposite side of the rotor for magnetic lines of force to pass therethrough and to be attracted toward said one side. One of the rotor and the armature comprises the magnetic-path member according to claim 1.

The third aspect of the invention provides a method of manufacturing a magnetic-path member for magnetic lines of force occurring from an electromagnet to pass therethrough. The method includes a first step of forming an opening to a magnetic portion and forming the magnetic portion into a predetermined outer shape. The method includes a second step of placing the magnetic portion with the opening faced up in a vertical direction and placing a predetermined amount of a powdery non-magnetic material in the opening. The method includes a third step of heat sintering the non-magnetic material to be coupled to magnetic portions to form a magnetic-path member before cooling the magnetic-path member.

The first step includes providing a magnetic bottom integrally the connecting magnetic portions as inner and outer peripheral sides to form the opening between the magnetic portions.

The first step includes separately positioning the magnetic portions as inner and outer peripheral sides with a mold interposed between the magnetic portions. The first step includes forming, between the magnetic portions as the inner and outer peripheral sides, an opening having the mold as a bottom.

The second step includes measuring an amount of the powdery non-magnetic material when the predetermined amount of the powdery non-magnetic material is placed in the opening.

The heat sintering of the third step is performed within a heating furnace.

The method further includes a fourth step after the third step, the fourth step of machining a surface of the magnetic-path member by a predetermined dimension.

The second and third steps are repeated plurality of times after the first step.

According to the magnetic-path member, the first and second magnetic-path portions are coupled and magnetically insulated using the non-magnetic portions. This effectively prevents magnetic short-circuit between the first and second magnetic portions, thus achieving stable quality of the magnetic-path member.

Differently from the related art, welding (electron beam welding) step is eliminated, which shortens operation time, and enhances productivity, allowing manufacturing at a low cost.

A powdery material to be sintered (non-magnetic material) is molten in a short time. This enhances productivity, and forms a structure that closely adheres to the magnetic portions bonded thereto, thus ensuring a desired strength.

The depression of the non-magnetic portion defines an air space, which magnetoresistance further improves the effect (effect of magnetic insulation) of preventing magnetic lines of force from leaking.

The non-magnetic portion after heat sintering has minute spaces. The minute spaces filled with air improve cushioning. The minute spaces filled with oil improve cooling and lubricity.

The rotor or the armature for magnetic lines of force to pass therethrough employs the magnetic-path member. This structure is manufactured at a low cost, and achieves stable magnetic characteristics, stable operation and excellent operating response.

The manufacturing method for a magnetic-path member is excellent in productivity, and achieves mass production of the magnetic-path member with stable quality at a low cost.

The magnetic portions are configured not as a plurality of separate members but as one body. This structure prevents cost increase and complexity associated with the machining of the magnetic portions, process control, and the like.

This manufacturing method positions the magnetic portions using the mold. This manufacturing method simplifies a process by eliminating the step of cutting off an unnecessary portion between the magnetic portions after sintering. This manufacturing method maintains the dimensional accuracy of the magnetic-path member high and reduces manufacturing time.

The manufacturing method includes the step of measuring the amount of powdery material (non-magnetic material) which is placed in the opening. This step determines the ratio of the non-magnetic portion to the magnetic portions after sintering. Beforehand measuring the amount of the non-magnetic material adjusts the relative positions (e.g., the size of the depression) of end portions of the non-magnetic portion after sintering with respect to reference positions such as the axial end portions (radial surfaces) of the magnetic portions.

This manufacturing method performs sintering within the heating furnace and therefore establishes a stable atmosphere in the heating furnace. This method achieves an even and continuous sintering action on each magnetic-path member, thus further improving mass productivity.

The fourth step is performed after the third step, whereby the surface of the magnetic-path member is finished so that the magnetic-path member has predetermined dimensions. This manufacturing method stably and accurately forms the magnetic-path member into a final shape.

After the first step, the second and third steps are repeated a plurality of times, whereby the sintered layers are formed. This manufacturing method prevents uneven sintering in the non-magnetic portion, allows the internal structure to be stable and dense, and increases the bond strength between the non-magnetic portion and each of the magnetic portions.

DETAILED DESCRIPTION OF THE PREFERRED EMBODIMENTS

First Embodiment

A magnetic-path member 1 of a first embodiment and a method of manufacturing the same will be described with reference to FIGS. 1A to 7. Members and the like to which reference numerals are not given in the following description are not illustrated in the drawings.

The magnetic-path member 1, through which magnetic lines of force produced by an electromagnet pass, has the following features.

Figure 1A:
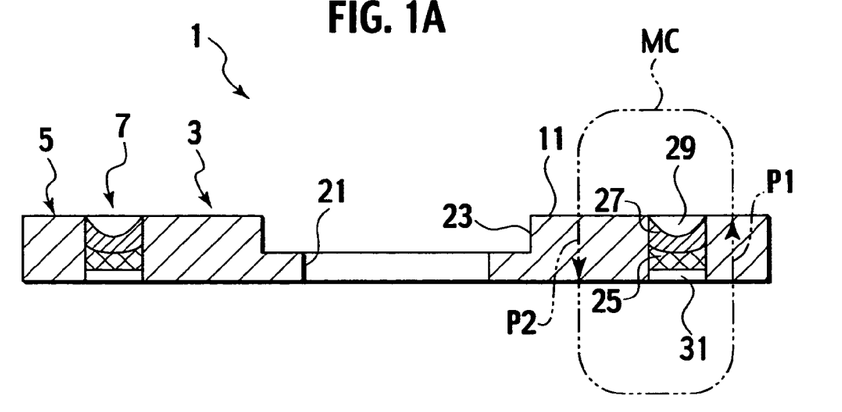
FIG. 1A is a cross-sectional view taken along IA-IA, illustrating a magnetic-path member of a first embodiment.
Figure 1B:
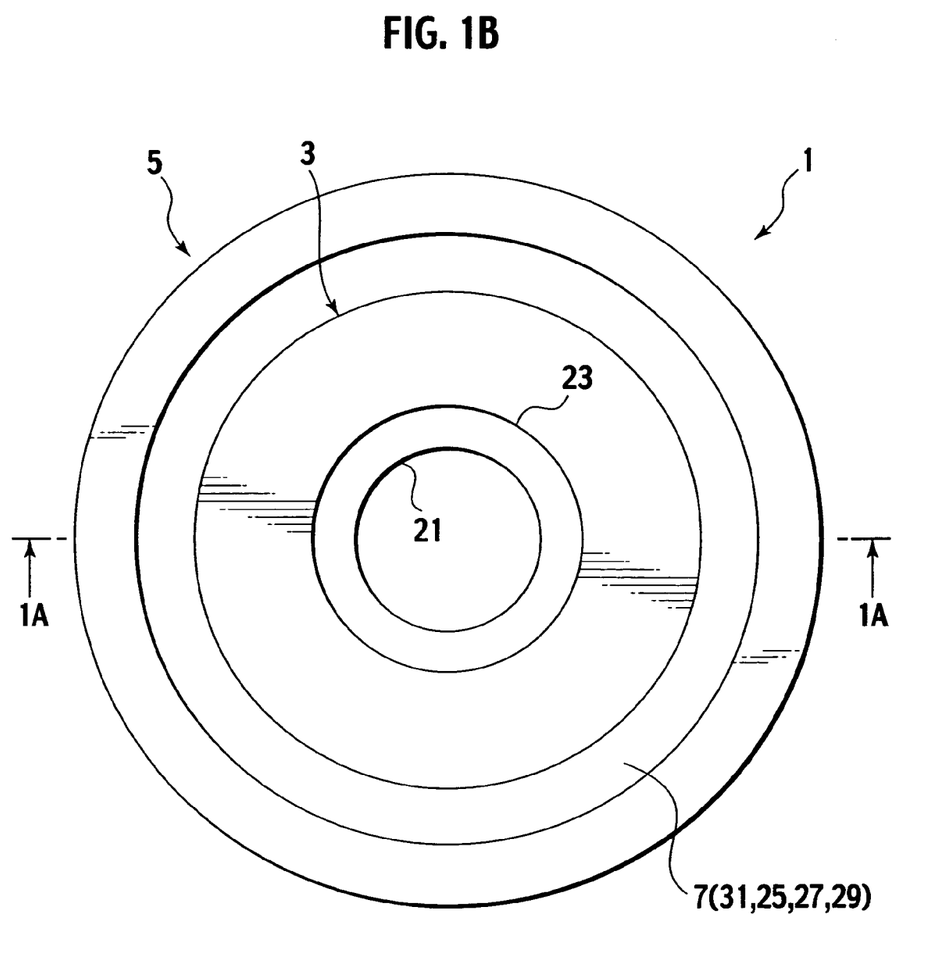
FIG. 1B is a plan view illustrating the magnetic-path member of FIG. 1A.

The magnetic-path member 1 includes a first magnetic portion 3 and a second magnetic portion 5 which are made of a magnetic material and respectively placed on the inner and outer peripheral sides. The magnetic-path member 1 includes a non-magnetic portion 7 which is interposed between the magnetic portions 3 and 5 to couple the magnetic portions 3 and 5 by heat sintering. The non-magnetic portion 7 prior to heat sintering is made of a powdery non-magnetic material 9. The non-magnetic portion 7 is recessed from radial surfaces 11 at the axial ends of the magnetic portions 3 and 5.

The method of manufacturing the magnetic-path member 1, through which magnetic lines of force occurring from an electromagnet pass, has the following features.

In the first step, an opening 15 is formed between the magnetic portions 3 and 5, and the outer shape thereof is formed into a predetermined shape. In the second step, the opening 15 is faced upward in the vertical direction, and a predetermined amount of powdery material (non-magnetic material 9) is placed in the opening 15. In the third step, the non-magnetic material 9 is coupled to the magnetic portions 3 and 5 by heat sintering to form the magnetic-path member 1, and then the magnetic-path member 1 is cooled. In the first step, the opening 15 is formed between the magnetic portions 3 and 5 by providing a magnetic bottom portion 17 which integrally connects the magnetic portions 3 and 5 on the inner and outer peripheral sides. The second step includes the step of measuring the predetermined amount of the non-magnetic material 9 when the predetermined amount of the non-magnetic material 9 is placed in the opening 15. The heat sintering of the third step is performed in a heating furnace 19. In the fourth step, which is performed after the third step, the surface of the magnetic-path member 1 is finished so that the magnetic-path member 1 has predetermined dimensions. After the first step, the second and third steps are repeated plurality of times.

The magnetic-path member 1 has the following structure.

Refer to FIGS. 1A and 1B. The magnetic-path member 1 is an annular member. The magnetic-path member 1 includes the first magnetic portion 3 on the inner peripheral side and the second magnetic portion 5 on the outer peripheral side. The magnetic-path member 1 includes the non-magnetic portion 7 which couples the magnetic portions 3 and 5 by heat sintering.

The first magnetic portion 3 has a central hole 21 and an annular recessed portion 23. The non-magnetic portion 7 includes a sintered layer 25 subjected to heating twice and a sintered layer 27 subjected to heating once. The non-magnetic portion 7 has a depression 29 in the upper portion thereof in the vertical direction due to the own weight. On the opposite side thereto, the non-magnetic portion 7 has a space 31 formed by regrinding in cutting.

The method of manufacturing the magnetic-path member 1 includes the following steps.

Figure 2:
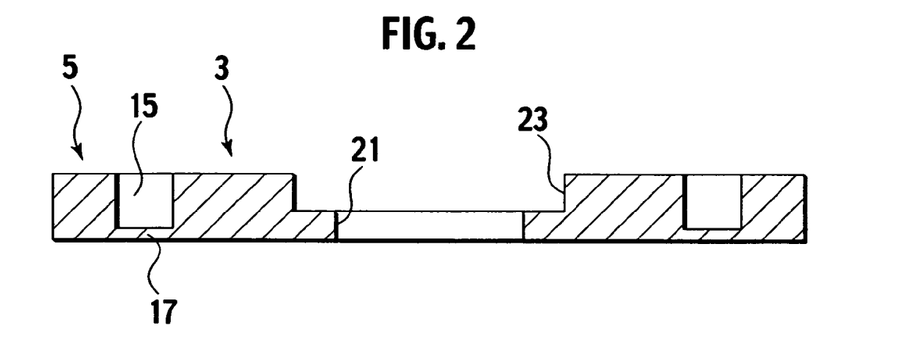
FIG. 2 is a cross-sectional view of the magnetic-path member in a first step of a method of manufacturing the magnetic-path member, and illustrates inner- and outer-peripheral side magnetic portions, a magnetic bottom portion integrally connecting the inner- and outer-peripheral side magnetic portions, and an opening.

Refer to FIG. 2. In the first step, the opening 15 is formed between the magnetic portions 3 and 5 so that the magnetic bottom portion 17 is left. The magnetic portions 3 and 5 are not cut off from each other but coupled together with the magnetic bottom portion 17.

The shape of the opening 15 is arbitrarily set in consideration of how external forces from peripheral members act.

The surface roughness of the opening 15 is also arbitrary. For example, appropriate roughness increases the bond strength between the non-magnetic portion 7 formed by heat sintering and each of the magnetic portions 3 and 5.

Figure 3:
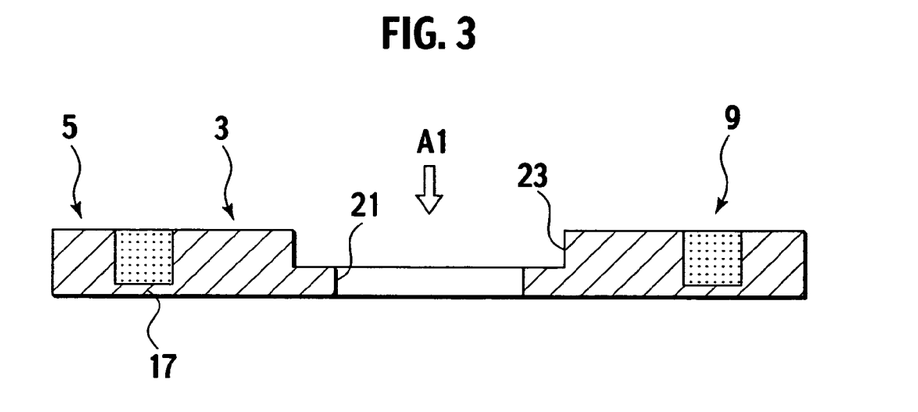
FIG. 3 is a cross-sectional view of the magnetic-path member in a second step subsequent to the first step of FIG. 2, and illustrates the step of placing non-magnetic material in the opening.

The second step will be described with reference to FIG. 3. The magnetic portions 3 and 5 and the magnetic bottom portion 17 are placed with the opening 15 faced upward in the vertical direction. A predetermined amount of powdery material (non-magnetic material 9) is measured. In this step, the amount of the non-magnetic material 9 is equal to the amount of capacity of the opening 15 and, for example, it is measured so that the height of the non-magnetic material 9 becomes equal to those of the end faces of the opening 15. The measured non-magnetic material 9 of the predetermined amount is placed in the opening 15.

The non-magnetic material 9 is powdery non-magnetic material, e.g., copper, aluminum, or stainless steel. The "non-magnetic material" includes a paramagnetic material or an antiferromagnetic material. The "magnetic material" includes a ferromagnetic material.

Figure 4:
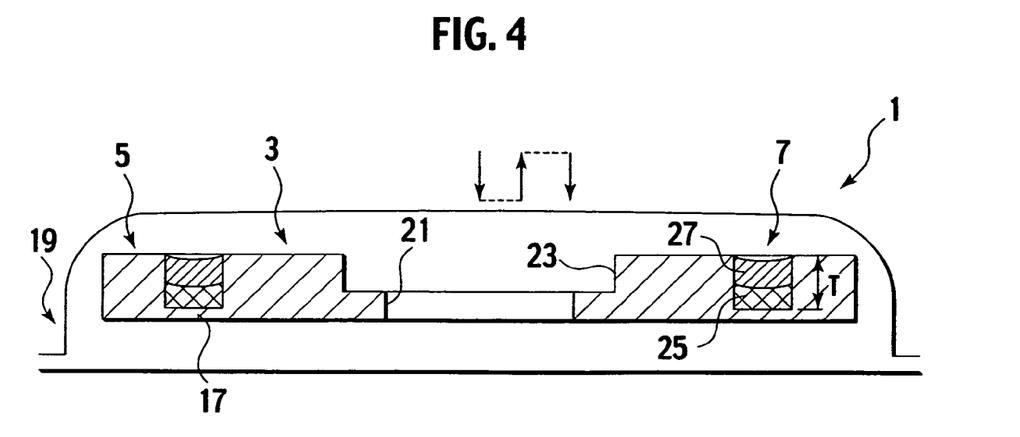
FIG. 4 is a cross-sectional view of the magnetic-path member in a third step subsequent to the second step of FIG. 3, and illustrates the step of manufacturing the magnetic-path member in a heating furnace by heat sintering.

The third step will be described with reference to FIG. 4. Heat sintering is performed within the heating furnace 19. The non-magnetic material 9 is coupled to the magnetic portions 3 and 5 by heat sintering to become the non-magnetic portion 7, thus forming the magnetic-path member 1.

After the heat sintering of the third step, the measurement of the amount of the non-magnetic material 9 and the placement thereof in the opening 15 in the second step and the heat sintering of the third step are repeated required times. In the case of this magnetic-path member 1, heat sintering is performed twice. As described previously, heat sintering performed twice forms the sintered layers 25 and 27 and the depression 29 due to their own weights. The sintered layer 25 has a dense and stable structure because of heating performed twice. The sintered layers 25 and 27 do not have a clear boundary after heating has been performed twice, but are fused together.

Figure 5:
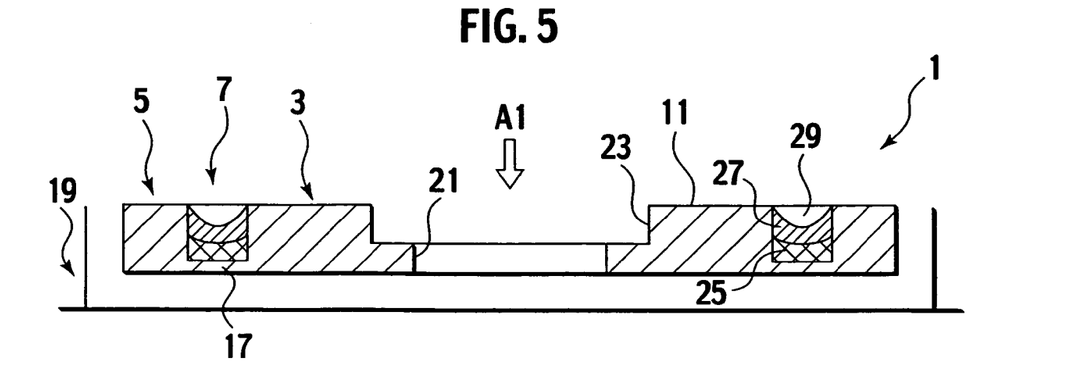
FIG. 5 is a cross-sectional view of the magnetic-path member in the third step, and illustrates the step of cooling the magnetic-path member after heat sintering.

Refer to FIG. 5. In the third step, a lid of the heating furnace 19 is opened, whereby the magnetic-path member 1 is cooled by outside air A1.

In the third step, the non-magnetic material 9 forms at the central portion the depression 29 of the non-magnetic portion 7 while expelling bubbles by the own weight in a period from melting in heat sintering to cooling. This step ensures a sufficient contact length T (FIG. 4) at the interface between the non-magnetic portion 7 and the opening 15, and achieves a sufficient bond strength between the non-magnetic portion 7 and each of the magnetic portions 3 and 5.

Heat sintering ensures the bond strength between the non-magnetic portion 7 and each of the magnetic portions 3 and 5, forms the non-magnetic portion 7 so that the density of the internal structure thereof is in a predetermined state, and suppresses the magnetic portions 3 and 5 from deforming. In consideration of these, atmosphere, temperature, time, and the like are managed in a process from heat sintering to cooling.

Figure 6:
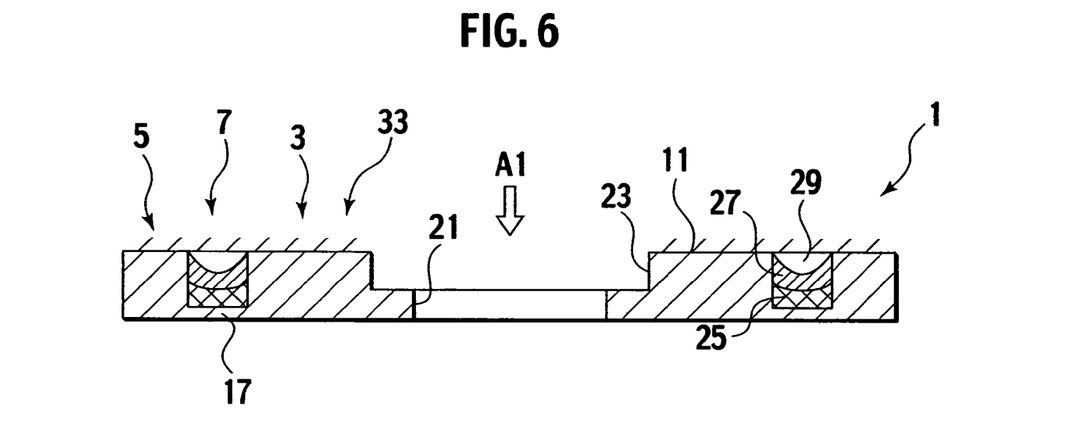
FIG. 6 is a cross-sectional view of the magnetic-path member in a fourth step subsequent to the third step of FIG. 5, and illustrates the step of finishing the magnetic-path member after cooling.

Refer to FIG. 6. In the fourth step, the radial surfaces 11 of the magnetic-path member 1 (magnetic portions 3 and 5) after cooling are finished.

Figure 7:
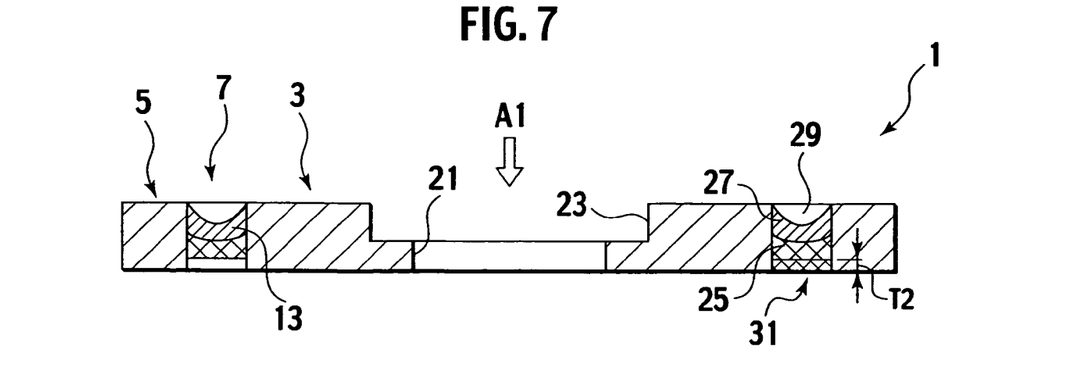
FIG. 7 is a cross-sectional view of the magnetic-path member in the fourth step, and illustrates the step of cutting the magnetic bottom portion and regrinding a non-magnetic portion.

Next, refer to FIG. 7. The magnetic bottom portion 17 of the magnetic-path member 1 is cut at a length T2. At this time, the sintered layer 25 of the non-magnetic portion 7 is appropriately reground to form the space 31.

The magnetic-path member 1 achieves the following benefits.

The magnetic portions 3 and 5 are coupled and magnetically insulated using the non-magnetic portion 7 formed by heat sintering. This magnetic insulation effectively prevents the magnetic portions 3 and 5 from magnetically shortening, thus achieving a magnetic-path member with a stable quality.

A method which does not employ welding (electron beam welding) reduces operating time and improves productivity, thus achieving low-cost manufacture. This method prevents uneven welding, variations in cutting performance, and the variation in the quality. This method solves electron beam welding-specific problems such as incomplete fusion, burn-through, hot crack, and composition change in welding material; the necessity for an expensive vacuum chamber and an exhaust system; and the difficulty of setting appropriate welding conditions.

In the heat sintering of the non-magnetic portion 7 in the formation of the magnetic-path member 1, material to be sintered and sintering conditions may be selected. The material to be sintered is, for example, a non-magnetic powdery material such as copper, aluminum, or stainless steel, and has a particle size or a mixture of materials having different properties and particle sizes. The sintering conditions are, for example, sintering temperature, sintering time, sintering atmosphere, and the number of times of sintering. Selection from conditions adjusts the value of the bond strength between the non-magnetic portion 7 and each of the magnetic portions 3 and 5 and the value of the effect of magnetic insulation to desired values.

The powdery non-magnetic material 9 is melted for a short time, thus improving productivity. Further, the powdery non-magnetic material 9 constitutes a structure which closely adheres to the magnetic portions 3 and 5 bonded thereto, thus ensuring a desired strength.

The non-magnetic portion 7 has the depression 29 formed in the radial surfaces at the axial end portions of the magnetic portions 3 and 5. The depression 29 defines an air space, whereby the magnetoresistance thereof further improves the effect (effect of magnetic insulation) of preventing magnetic lines of force from leaking.

With the depression 29, the non-magnetic portion 7 does not come into contact with a member which touches the magnetic-path member 1. This structure prevents the interference between the non-magnetic portion 7 and each of peripheral members, e.g., an armature and a clutch plate, and allows the radial surfaces of the magnetic portions 3 and 5 to flatly touch peripheral members. Accordingly, when magnetic lines of force pass through the magnetic-path member 1 and these peripheral members, variations in the magnetic lines of force are reduced, and the magnetic lines of force are stabilized.

During the machining of the radial surfaces of the magnetic portions 3 and 5, the non-magnetic portion 7 having the depression 29 is not machined. This method eliminates the necessity for setting conditions (replacement of a blade, adjustment of machining speed, and the like) for machining the non-magnetic portion 7, whereby an increase in cost is avoided.

The above-described benefits does not achieved with electron beam welding, but are achieved by the sintering step of the invention. This sintering step does not use a step or device for adjustment.

Moreover, in the case where a magnetic-path member is manufactured by casting a non-magnetic portion into first and second magnetic portions, expensive large-scale heat treatment equipment is necessary to remove casting strain by heat treatment such as annealing or to adjust the effect of magnetic insulation and cutting machinability.

The method of manufacturing the magnetic-path member 1 achieves the following benefits.

The magnetic-path member 1 having the aforementioned benefits is achieved by coupling the magnetic portions 3 and 5 using the non-magnetic portion 7 formed by heat sintering.

This manufacturing method is excellent in productivity, and achieves mass production of the magnetic-path member 1 with stable quality at a low cost.

The shape of the opening 15 between the magnetic portions 3 and 5 is arbitrarily set in consideration of how external forces from peripheral members act.

The surface roughness of the opening 15 is also arbitrary. For example, appropriate surface roughness increases the bond strength between the non-magnetic portion 7 and each of the magnetic portions 3 and 5.

The magnetic portions 3 and 5 are configured not as a plurality of separate members but as one body. This structure prevents cost increase and complexity associated with the machining of the magnetic portions 3 and 5, process control, and the like.

The magnetic bottom portion 17 accurately positions the magnetic portions 3 and 5 and prevents displacement. This positioning improves the dimensional accuracy of the magnetic-path member 1 and has great advantages in terms of the prevention of vibration in the case where the magnetic-path member 1 is used as a rotary member.

The manufacturing method includes the step of measuring the amount of powdery material (non-magnetic material 9) which is placed in the opening 15. This step determines the ratio of the non-magnetic portion 7 to the magnetic portions 3 and 5 after sintering. Beforehand measuring the amount of the non-magnetic material 9 adjusts the relative positions (e.g., the size of the depression 29) of end portions of the non-magnetic portion 7 after sintering with respect to reference positions such as the axial end portions (radial surfaces 11) of the magnetic portions 3 and 5.

For example, a volume of the non-magnetic material 9 is measured equal to the capacity of the opening 15. Shrinkage during sintering recesses the end portion of the non-magnetic portion 7 from the axial end portions of the magnetic portions 3 and 5 and forms the depression 29, thus achieving the benefits of the depression 29.

The benefits of measuring the amount of the non-magnetic material 9 (e.g., the utilization of shrinkage during sintering) are not achieved by a magnetic-path member manufactured by electron beam welding or casting.

This manufacturing method performs sintering within the heating furnace 19 and therefore establishes a stable atmosphere in the heating furnace 19. This method achieves an even and continuous sintering action on each magnetic-path member 1, thus further improving mass productivity.

The fourth step is performed after the third step, whereby the surface of the magnetic-path member 1 is finished so that the magnetic-path member 1 has predetermined dimensions. This manufacturing method stably and accurately forms the magnetic-path member 1 into a final shape.

After the first step, the second and third steps are repeated a plurality of times, whereby the sintered layers 25 and 27 are formed. This manufacturing method prevents uneven sintering in the non-magnetic portion 7, allows the internal structure to be stable and dense, and increases the bond strength between the non-magnetic portion 7 and each of the magnetic portions 3 and 5.

The effects of repeating an arbitrary times the second step of placing a predetermined amount of the non-magnetic material 9 in the opening 15 and the third step of subjecting the non-magnetic material 9 to heat sintering and of cooling are not achieved by a magnetic-path member manufactured by electron beam welding or casting.

Second Embodiment

A magnetic-path member 101 of a second embodiment and a method of manufacturing the same will be described with reference to FIGS. 8A to 13. Members and the like to which reference numerals are not given in the following description are not illustrated in the drawings.

The magnetic-path member 101, through which magnetic lines of force produced by an electromagnet pass, has the following features.

Figure 8A:
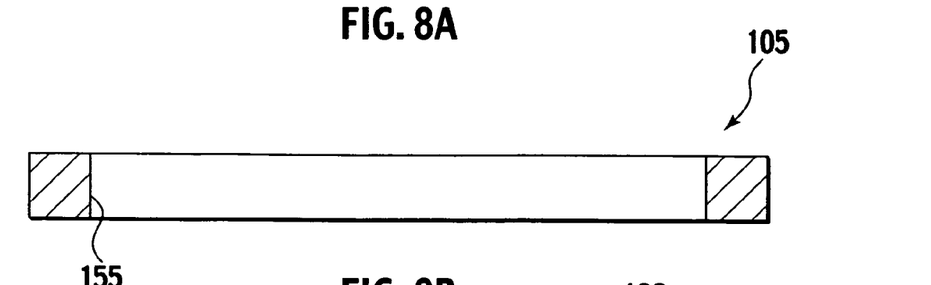
FIG. 8A is a cross-sectional view illustrating an outer-peripheral side magnetic portion of a magnetic-path member according to a second embodiment.
Figure 8B:
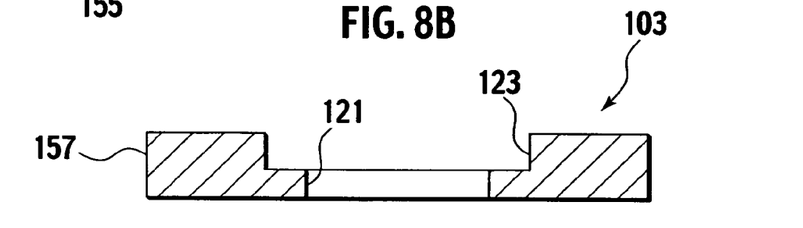
FIG. 8B is a cross-sectional view illustrating an inner-peripheral side magnetic portion of the magnetic-path member.

The magnetic-path member 101 includes a first magnetic portion 103 and a second magnetic portion 105 which are made of a magnetic material and respectively placed on the inner and outer peripheral sides. The magnetic-path member 101 includes a non-magnetic portion 107 which is interposed between the magnetic portions 103 and 105 to couple the magnetic portions 103 and 105 by heat sintering. The non-magnetic portion 107 prior to heat sintering is made of powdery non-magnetic material 109. The non-magnetic portion 107 is recessed from radial surfaces 111 at the axial ends of the magnetic portions 103 and 105. The non-magnetic portion 107 after heat sintering has minute spaces 113 therein.

The method of manufacturing the magnetic-path member 101, through which magnetic lines of force occurring from an electromagnet pass, has the following features.

Figure 9:
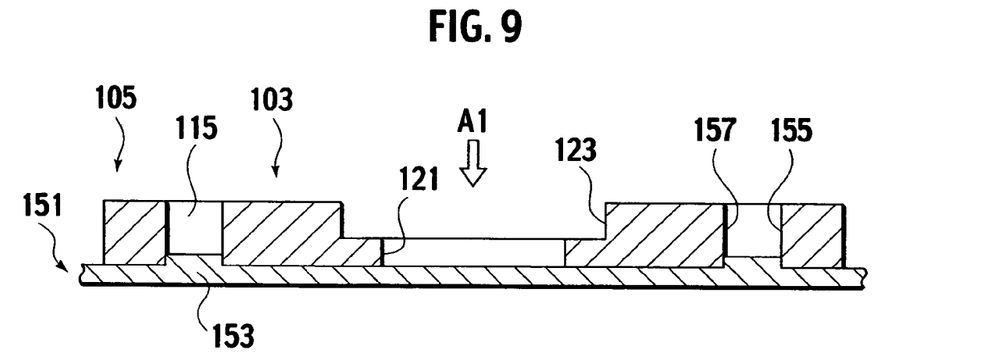
FIG. 9 is a cross-sectional view of the magnetic-path member in a first step of a method of manufacturing the magnetic-path member, and illustrates the step of setting the inner- and outer-peripheral side magnetic portions on a mold and forming an opening.
Figure 10:
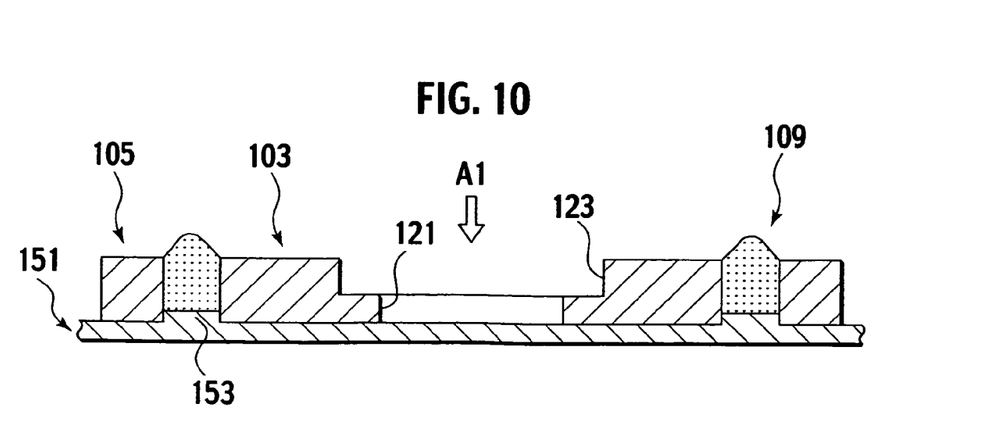
FIG. 10 is a cross-sectional view of the magnetic-path member in a second step subsequent to the first step of FIG. 9, and illustrates the step of placing non-magnetic material in the opening.
Figure 11:
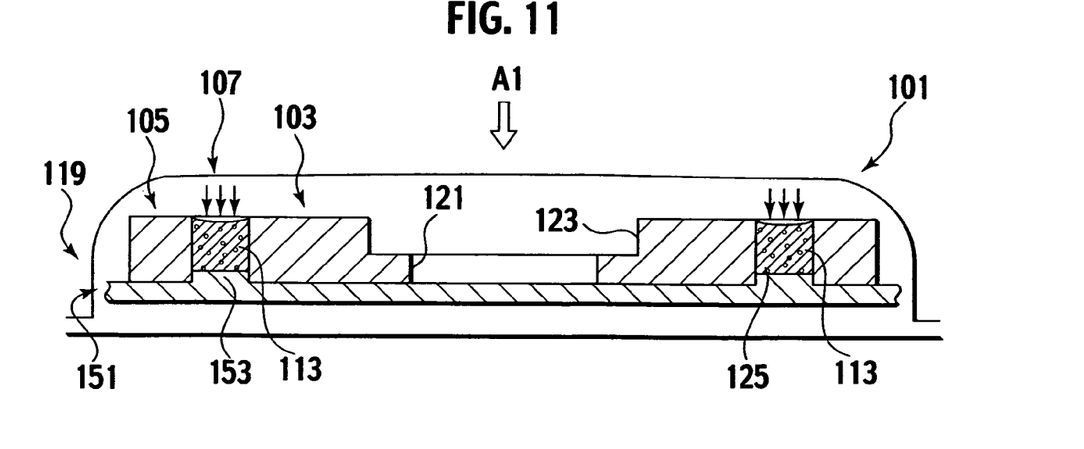
FIG. 11 is a cross-sectional view of the magnetic-path member in a third step subsequent to the second step of FIG. 10, and illustrates the step of manufacturing the magnetic-path member in a heating furnace by heat sintering.

In the first step, an opening 115 is formed between the magnetic portions 103 and 105, and the outer shape thereof is formed into a predetermined shape. In the second step, the opening 115 is faced upward in the vertical direction, and a predetermined amount of powdery material (non-magnetic material 109) is placed in the opening 115. In the third step, the non-magnetic material 109 is coupled to the magnetic portions 103 and 105 by heat sintering to form the magnetic-path member 101, and then the magnetic-path member 101 is cooled.

In the first step, the magnetic portions 103 and 105 as inner and outer peripheral sides are spaced from each other using the mold 151. The opening 115 is formed between respective magnetic portions 103 and 105, with a bottom of the mold 151.

The second step includes the step of measuring the predetermined amount of the non-magnetic material 109 when the predetermined amount of the non-magnetic material 109 is placed in the opening 115.

The heat sintering of the third step is performed in a heating furnace 119.

Figure 13:
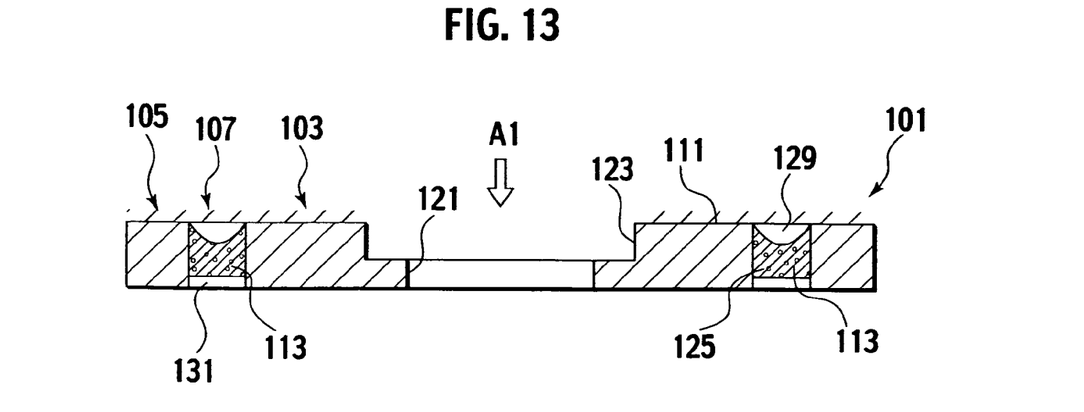
FIG. 13 is a cross-sectional view of the magnetic-path member in a fourth step subsequent to the third step of FIG. 12, and illustrates the step of finishing the magnetic-path member after cooling and regrinding a non-magnetic portion.

In the fourth step, which is performed after the third step, the surface of the magnetic-path member 101 is finished so that the magnetic-path member 101 has predetermined dimensions.

The magnetic-path member 101 has the following structure. The magnetic-path member 101 is an annular member. The magnetic-path member 101 includes the first magnetic portion 103 on the inner peripheral side and the second magnetic portion 105 on the outer peripheral side. The magnetic-path member 101 includes the non-magnetic portion 107 which couples the magnetic portions 103 and 105 by heat sintering. The non-magnetic portion 107 has a sintered layer 125. The non-magnetic portion 107 has a depression 129 in the upper portion thereof in the vertical direction due to the own weight. On the opposite side thereto, the non-magnetic portion 107 has a space 131 formed by removing the mold 151 from the magnetic portions 103 and 105.

The method of manufacturing the magnetic-path member 101 will be described.

Refer to FIGS. 8A and 8B. Both of the inner and outer-peripheral side magnetic portions 103 and 105 are annular members and prepared as separate bodies. The inner-peripheral side magnetic portion 103 has a central hole 121 and an annular recessed portion 123 around the central hole 121.

The first step will be described with reference to FIG. 9. The outer periphery 155 of the outer-side magnetic portion 105 is set on the outside of an annular protruded portion 153 provided in the mold 151. The outer periphery 157 of the inner-peripheral side magnetic portion 103 is set on the inside of the annular protruded portion 153. This setting places the magnetic portions 103 and 105 so that the magnetic portions 103 and 105 are spaced with the mold 151 interposed therebetween. This setting forms the opening 115 between the magnetic portions 103 and 105 on the mold 151 as a bottom portion.

The shape of the opening 115 is arbitrarily set in consideration of how external forces from peripheral members act.

The surface roughness of the opening 115 is also arbitrary. For example, appropriate roughness increases the bond strength between the non-magnetic portion 107 formed by heat sintering and each of the magnetic portions 103 and 105.

The second step will be described with reference to FIG. 10. The magnetic portions 103 and 105 are placed with the opening 115 faced upward in the vertical direction. A predetermined amount of powdery material (non-magnetic material 109) is measured. In this step, the amount of the non-magnetic material 109 is greater than the amount of capacity of the opening 115. The measured non-magnetic material 109 of the predetermined amount is placed in the opening 115.

The non-magnetic material 109 is powdery non-magnetic material, e.g., copper, aluminum, or stainless steel.

The third step will be described with reference to FIG. 11. Heat sintering is performed within the heating furnace 119. The non-magnetic material 109 is coupled to the magnetic portions 103 and 105 by heat sintering to become the non-magnetic portion 107, thus forming the magnetic-path member 101. During this step, the non-magnetic portion 107 is formed with a depression 129 due to the own weight of the non-magnetic material 109.

Figure 12:
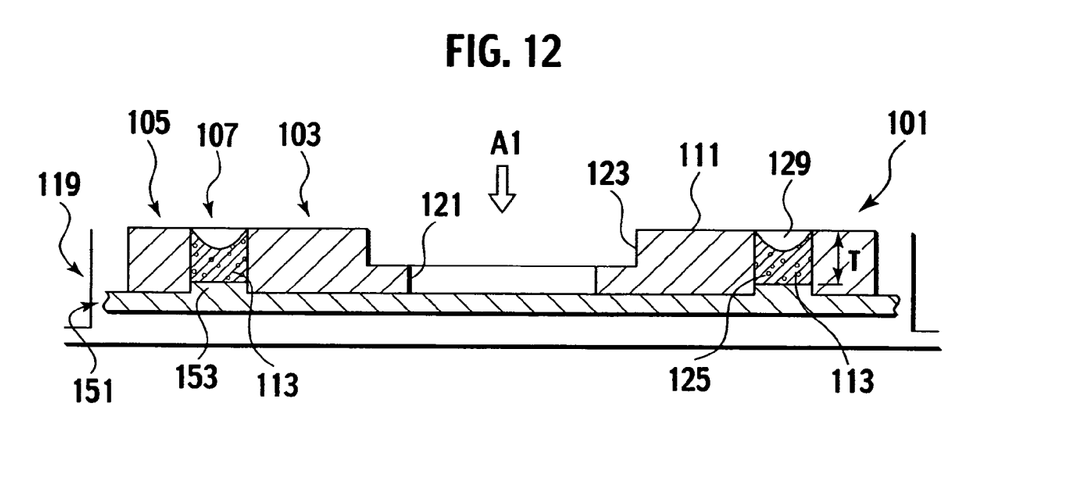
FIG. 12 is a cross-sectional view of the magnetic-path member in the third step, and illustrates the step of cooling the magnetic-path member after heat sintering.

Refer to FIG. 12. In the third step, a lid of the heating furnace 119 is opened, whereby the magnetic-path member 101 is cooled by outside air A1

The non-magnetic material 109 forms at the central portion the depression 129 of the non-magnetic portion 107 while expelling bubbles by the own weight in a period from melting in heat sintering to cooling. This step ensures a sufficient contact length T (FIG. 12) at the interface between the non-magnetic portion 107 and the opening 115, and achieves a sufficient bond strength between the non-magnetic portion 107 and each of the magnetic portions 103 and 105.

Heat sintering ensures the bond strength between the non-magnetic portion 107 and each of the magnetic portions 103 and 105, forms the non-magnetic portion 107 so that the density of the internal structure thereof and minute spaces 113 are in a predetermined state, and suppresses the magnetic portions 103 and 105 from deforming. In consideration of these, atmosphere, temperature, time, and the like are managed in a process from heat sintering to cooling.

Refer to FIG. 13. In the fourth step, the radial surfaces 111 of the magnetic-path member 101 (magnetic portions 103 and 105) after cooling are finished.

Then, the mold 151 is removed, and a space 131 corresponding to the annular protruded portion 153 is formed in the non-magnetic portion 107.

For the mold 151, a material such as stainless steel may be used, the material being dissimilar to the magnetic-path member 101 (magnetic portions 103 and 105 and non-magnetic portion 107) and having a higher transformation point than that of the magnetic-path member 101 in heat sintering. This material facilitates the removal thereof from the mold 151.

The magnetic-path member 101 achieves the following benefits.

The magnetic portions 103 and 105 are coupled and magnetically insulated using the non-magnetic portion 107 formed by heat sintering. This magnetic insulation effectively prevents the magnetic portions 103 and 105 from magnetically shortening, thus achieving a magnetic-path member with a stable quality.

A method which does not employ welding (electron beam welding) reduces operating time and improves productivity, thus achieving low-cost manufacture. This method prevents uneven welding, variations in cutting performance, and the variation in the quality. This method solves electron beam welding-specific problems such as incomplete fusion, burn-through, hot crack, and composition change in welding material; the necessity for an expensive vacuum chamber and an exhaust system; and the difficulty of setting appropriate welding conditions.

In the heat sintering of the non-magnetic portion 107 in the formation of the magnetic-path member 101, material to be sintered and sintering conditions may be selected. The material to be sintered is, for example, a non-magnetic powdery material such as copper, aluminum, or stainless steel, and has a particle size or a mixture of materials having different properties and particle sizes. The sintering conditions are, for example, sintering temperature, sintering time, sintering atmosphere, and the number of times of sintering. Selection from conditions adjusts the value of the bond strength between the non-magnetic portion 107 and each of the magnetic portions 103 and 105 and the value of the effect of magnetic insulation to desired values.

The powdery non-magnetic material 109 is melted for a short time, thus improving productivity. Further, the powdery non-magnetic material 109 constitutes a structure which closely adheres to the magnetic portions 103 and 105 bonded thereto, thus ensuring a desired strength.

The non-magnetic portion 107 has the depression 129 formed in the radial surfaces at the axial end portions of the magnetic portions 103 and 105. The depression 129 defines an air space, whereby the magnetoresistance thereof further improves the effect (effect of magnetic insulation) of preventing magnetic lines of force from leaking.

With the depression 129, the non-magnetic portion 107 does not come into contact with a member which touches the magnetic-path member 101. This structure prevents the interference between the non-magnetic portion 107 and each of peripheral members, e.g., an armature and a clutch plate, and allows the radial surfaces of the magnetic portions 103 and 105 to flatly touch peripheral members. Accordingly, when magnetic lines of force pass through the magnetic-path member 101 and these peripheral members, variations in the magnetic lines of force are reduced, and the magnetic lines of force are stabilized.

During the machining of the radial surfaces of the magnetic portions 103 and 105, the non-magnetic portion 107 having the depression 129 is not machined. This method eliminates the necessity for setting conditions (replacement of a blade, adjustment of machining speed, and the like) for machining the non-magnetic portion 107, whereby an increase in cost is avoided.

The non-magnetic portion 107 after heat sintering has a porous structure having a large number of minute spaces 113 inside. The minute spaces 113 filled with air improve cushioning against peripheral members. The minute spaces 113 filled with oil improve cooling and lubricity.

Whether the minute spaces 113 are made independent or continuous may be adjusted, and the sizes of the minute spaces 113 may be adjusted. The independent minute spaces 113 make the magnetic-path member an airtight member, and allows the magnetic-path member to be applied to a hermetic device. The continuous minute spaces 113 ensure air permeability and improve the effect of cooling the magnetic-path member and peripheral members. The continuous minute spaces 113 prevent the magnetic-path member from adhering to the peripheral members. The minute spaces 113 containing oil improve lubricating and cooling effects. The minute spaces 113 of which sizes are adjusted change the magnetoresistance of air or oil contained in the minute spaces 113, and adjust the effects of magnetic insulation, adhesion prevention, lubricating, cooling, and the like.

The above-described benefits does not achieved with electron beam welding, but are achieved by the sintering step of the invention. This sintering step does not use a step or device for adjustment.

Moreover, a magnetic-path member obtained by pouring a non-magnetic portion into first and second magnetic portions does not achieve the effects of a porous sintered layer. Expensive large-scale heat treatment equipment is necessary to remove casting strain by heat treatment such as annealing or to adjust the effect of magnetic insulation and cutting machinability.

The method of manufacturing the magnetic-path member 101 achieves the following benefits.

The magnetic-path member 101 having the aforementioned benefits is achieved by coupling the magnetic portions 103 and 105 using the non-magnetic portion 107 formed by heat sintering.

This manufacturing method is excellent in productivity, and achieves mass production of the magnetic-path member 101 with stable quality at a low cost.

The shape of the opening 115 between the magnetic portions 103 and 105 is arbitrarily set in consideration of how external forces from peripheral members act.

The surface roughness of the opening 115 is also arbitrary. For example, appropriate surface roughness increases the bond strength between the non-magnetic portion 107 and each of the magnetic portions 103 and 105.

This manufacturing method positions the magnetic portions 103 and 105 using the mold 151. This manufacturing method simplifies a process by eliminating the step of cutting off an unnecessary portion between the magnetic portions 103 and 105 after sintering. Also, this manufacturing method maintains the dimensional accuracy of the magnetic-path member 101 high and reduces manufacturing time.

The mold 151 (annular protruded portion 153) positions the magnetic portions 103 and 105 and prevents displacement. This positioning improves the dimensional accuracy of the magnetic-path member 101 and has advantages in terms of the prevention of vibration in the case where the magnetic-path member 101 is used as a rotary member.

The manufacturing method includes the step of measuring the amount of powdery material (non-magnetic material 109) which is placed in the opening 115. This step determines the ratio of the non-magnetic portion 107 to the magnetic portions 103 and 105 after sintering. Beforehand measuring the amount of the non-magnetic material 109 adjusts the relative positions (e.g., the size of the depression 129) of end portions of the non-magnetic portion 107 after sintering with respect to reference positions such as the axial end portions (radial surfaces 111) of the magnetic portions 103 and 105.

For example, a volume of the non-magnetic material 109 is measured greater than the capacity of the opening 115. Shrinkage during sintering recesses the end portion of the non-magnetic portion 107 from the axial end portions of the magnetic portions 103 and 105 and forms the depression 129, thus achieving the benefits of the depression 129.

The benefits of measuring the amount of the non-magnetic material 109 (e.g., the utilization of shrinkage during sintering) are not achieved by a magnetic-path member manufactured by electron beam welding or casting.

This manufacturing method performs sintering within the heating furnace 119 and therefore establishes a stable atmosphere in the heating furnace 119. This method achieves an even and continuous sintering action on each magnetic-path member 101, thus further improving mass productivity.

The fourth step is performed after the third step, whereby the surface of the magnetic-path member 101 is finished so that the magnetic-path member 101 has predetermined dimensions. This manufacturing method stably and accurately forms the magnetic-path member 101 into a final shape.

Third Embodiment

Figure 14:
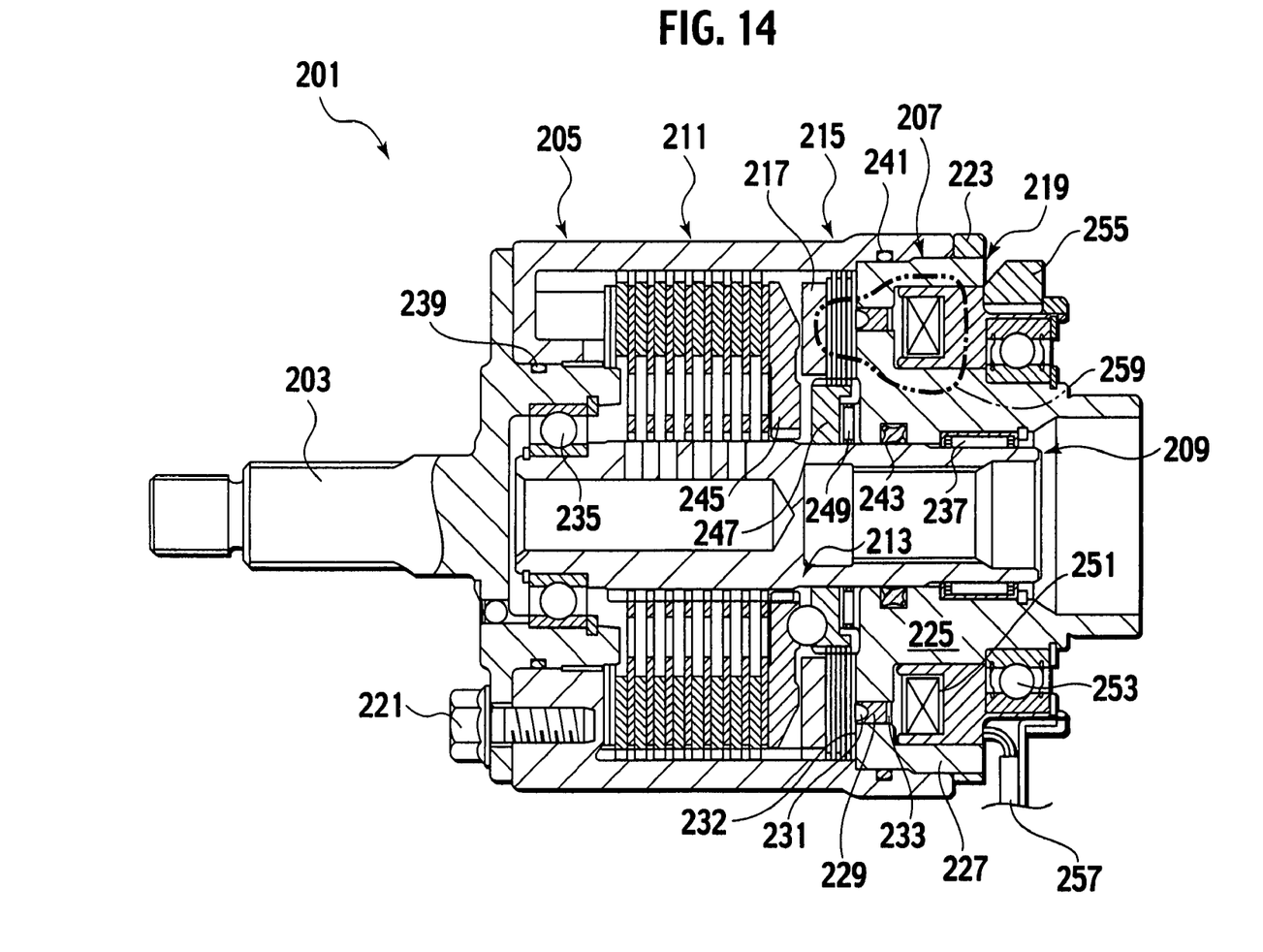
FIG. 14 is a cross-sectional view illustrating an electromagnetic coupling of a third embodiment.

Refer to FIG. 14. An electromagnetic coupling 201 (electromagnetic coupling device) of a third embodiment will be described.

The electromagnetic coupling 201 is used in a driving force transmission system of a vehicle. The left and right in the description below mean the left and right in FIG. 14. Members and the like to which reference numerals are not given in the following description are not illustrated in the drawing.

Features of the electromagnetic coupling 201 will be described.

The electromagnetic coupling 201 as an electromagnetic coupling device includes a rotor 207 through which magnetic lines of force pass. The electromagnetic coupling 201 includes an electromagnet 219 placed on one side of the rotor 207. The electromagnetic coupling 201 includes an armature 217 which is placed on the other side of the rotor 207, through which magnetic lines of force pass, the magnetic lines being attracted toward the one side. The rotor 207 uses the magnetic-path member 1 or 101 of the first or second embodiment.

The structure of the electromagnetic coupling 201 will be described.

The electromagnetic coupling 201 includes a power transmission shaft 203 on the input side and a rotary case 205 made of non-magnetic material. The electromagnetic coupling 201 includes the rotor 207 (magnetic-path member of the invention: magnetic-path member manufactured by the manufacturing method of the invention) which constitutes a rear side wall of the rotary case 205. The electromagnetic coupling 201 includes an inner shaft 209 on the output side, a multi-disc main clutch 211, a ball cam 213, a multi-disc pilot clutch 215, the armature 217, the electromagnet 219, and a controller. The coupling 201 is accommodated in a protective casing supported by the vehicle body.

The input-side power transmission shaft 203 is connected to the front end of the rotary case 205 using bolts 221. The driving force of an engine is transmitted to the input-side power transmission shaft 203 (rotary case 205) through a front-side power transmission system.

The rotor 207 is screwed into the rear-side opening of the rotary case 205 and fixed with nuts 223 having double-nut functions. The rotor 207 is an annular member. The rotor 207 includes magnetic portions 225 and 227 on the inner and outer peripheral sides, respectively. The rotor 207 includes a non-magnetic portion 229 which connects the magnetic portions 225 and 227 on the inner and outer peripheral sides by heat sintering. The non-magnetic portion 229 is given airtightness after being subjected to sintering twice. The left side (pilot clutch 215 side) of the non-magnetic portion 229 has a depression 231 formed by its own weight in heat sintering. The radial surfaces 232 of end portions of the depression 231 touch the surface of a first outer plate. On the opposite side, the non-magnetic portion 229 has a space 233 formed by regrinding in cutting. The non-magnetic portion 229, the depression 231, and the space 233 are filled with air. These kinds of air magnetically insulate the magnetic portions 225 and 227 from each other with their own magnetoresistances, and effectively prevent magnetic short circuits therebetween.

The inner shaft 209 is placed into the rotary case 205 from the rear. The front end of the inner shaft 209 is movably supported on the power transmission shaft 203 side by a ball bearing 235. The rear portion of the inner shaft 209 is movably supported by the rotor 207 using a needle bearing 237. The inner shaft 209 is connected to a connecting shaft, and this connecting shaft is connected to a rear-side power transmission system. The rotation of the inner shaft 209 is transmitted to a rear differential through this power transmission system.

The power transmission shaft 203 and the rotary case 205 have an O-ring 239 placed therebetween. The rotary case 205 and the rotor 207 have an O-ring 241 placed therebetween. The rotor 207 and the inner shaft 209 have as a seal an X-ring 243 which has an X-shaped cross section and which is placed therebetween. The electromagnetic coupling 201 is sealed with the O-rings 239 and 241 and the X-ring 243 and has oil contained in the electromagnetic coupling 201.

The main clutch 211 is placed between the rotary case 205 and the inner shaft 209. The main clutch 211 includes outer plates splined to the inside of the rotary case 205. The main clutch 211 includes inner plates splined to the outside of the inner shaft 209.

The ball cam 213 is placed between a pressure plate 245 and a cam ring 247. The pressure plate 245 is splined to the outside of the inner shaft 209. The cam ring 247 is movably supported by the outside of the inner shaft 209 so as to be rotatable relatively thereto. The cam ring 247 and the rotor 207 have a bearing 249 which is placed therebetween and subjected to the reaction force (thrust force) of the ball cam 213.

The pilot clutch 215 is placed between the rotary case 205 and the cam ring 247. The pilot clutch 215 includes outer plates splined to the inside of the rotary case 205. The pilot clutch 215 includes inner plates splined to the outside of the cam ring 247. The armature 217 is placed between the pilot clutch 215 and the pressure plate 245. The armature 217 is splined to the inside of the rotary case 205 and placed so as to be movable in the axial direction.

The electromagnet 219 attracts the armature 217 by magnetic attraction. The electromagnet 219 is movably supported on the rotor 207 by the ball bearing 253. The electromagnet 219 is placed in a recessed portion 251 of the rotor 207 with an appropriate air gap interposed therebetween. The electromagnet 219 is fixed to the protective casing by a coupling member 255 so as not to rotate relatively thereto. Lead wires 257 of the electromagnet 219 are led to the outside of the protective casing through a grommet and connected to a battery mounted on the vehicle through the controller.

As described above, the non-magnetic portion 229 magnetically insulates the inner- and outer-peripheral side magnetic portions 225 and 227 from each other in the rotor 207. Each plate of the pilot clutch 215 has cut-out portions and bridge portions at radial positions corresponding to the non-magnetic portion 229. The cut-out portions are provided to be equally spaced in the circumference direction, and the bridge portions connect these cut-out portions. The non-magnetic portion 229 and the cut-out portions prevent a magnetic flux from shortening on a magnetic path.

The air gap, the rotor 207, the pilot clutch 215, and the armature 217 constitute a magnetic path for the electromagnet 219. The controller performs the energization of the electromagnet 219, the control of an exciting current, the stopping of energization, and the like.

When the electromagnet 219 is energized, magnetic lines 259 of force are produced in the magnetic path. The electromagnet 219 attracts the armature 217 to engage the pilot clutch 215. The pilot clutch 215 rotates the cam ring 247 relatively to the pressure plate 245 and displaces balls of the ball cam 213 in the rotation direction and the axial direction. The balls displace the pressure plate 245 in the axial direction toward the main clutch 211. Under the thrust force produced by the ball cam 213, the pressure plate 245 presses the inner and outer plates against each other to engage the main clutch 211, and connects the electromagnetic coupling 201.

When the controller adjusts the exciting current of the electromagnet 219 to control the attraction thereof, the slip ratio of the pilot clutch 215 and the thrust force of the ball cam 213 are changed. These changes adjust the magnitude of transmission torque to be transmitted to a rear wheel side through the electromagnetic coupling 201 (main clutch 211).

When the energization of the electromagnet 219 is stopped, the pilot clutch 215 is disengaged, and the thrust force of the ball cam 213 is lost. Thus, the main clutch 211 is disengaged to release the connection of the electromagnetic coupling 201.

Benefits of the electromagnetic coupling 201 will be described.

The non-magnetic portion 229 formed by heat sintering couples the magnetic portions 225 and 227 of the rotor 207 and magnetically insulates the magnetic portions 225 and 227 from each other. This magnetic insulation effectively prevents short circuits between the magnetic lines 259 of force of the electromagnet 219, ensures stable characteristics of a magnetic path, and achieves stable operation and excellent operating response.

Heat sintering gives airtightness to the non-magnetic portion 229. The non-magnetic portion 229 allows the rotor 207 to be used as a side wall member of the electromagnetic coupling 201 of a hermetic type as described previously.

The rotor 207 achieves effects similar to those of the magnetic-path member 1 of the first embodiment and is mass-produced at a low cost. Accordingly, the electromagnetic coupling 201 is also manufactured at a low cost.

The non-magnetic portion 229 of the rotor 207 is singly given airtightness by heat sintering. On the other hand, in the case where the non-magnetic portion 229 does not singly have airtightness, airtightness is given by covering opening surface portions of the magnetic portions 225 and 227 and the surface of the non-magnetic portion 229 with a coating or placing a seal member. These structures allow the rotor 207 to function as a side wall on one side of a hermetic coupling (electromagnetic coupling 201) which is sealed to contain lubricating oil, between a rotary housing (rotary case 205) and a rotating shaft (inner shaft 209).

In the case where a seal member is placed to ensure airtightness, a groove may be formed in at least one of the magnetic portions 225 and 227 to interpose a ring made of rubber between the magnetic portions 225 and 227. In the case where covering with a coating is performed to ensure airtightness, it is possible to use metal plating, resin coating, or welding or vapor deposition of fluorine, chromium, nickel, silicon, sulfur, or the like. This coating also achieves the effect of preventing electric erosion.

Fourth Embodiment

Figure 15:
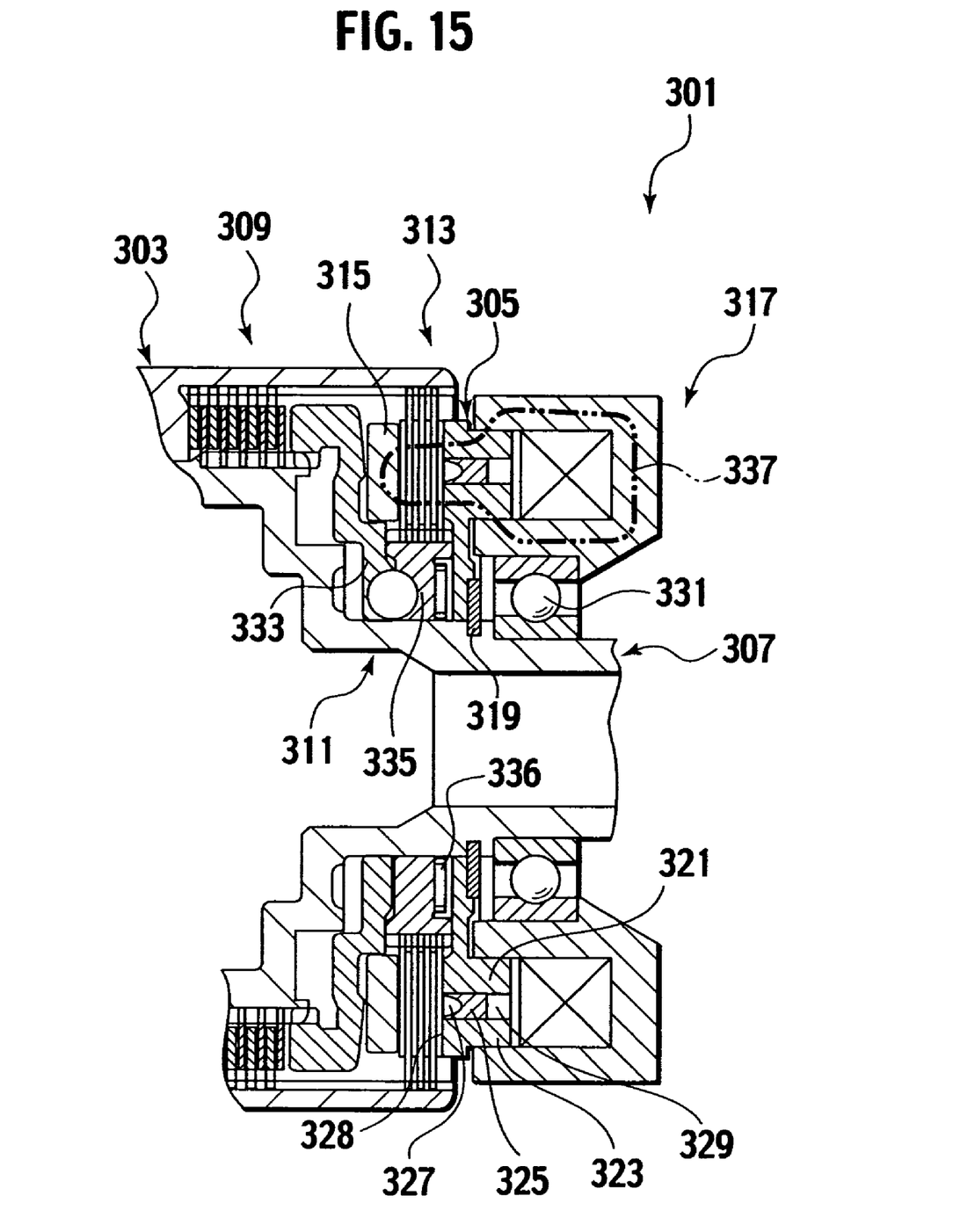
FIG. 15 is a cross-sectional view illustrating an electromagnetic clutch of a fourth embodiment.

Refer to FIG. 15. An electromagnetic clutch 301 (electromagnetic coupling device) of a fourth embodiment will be described.

The left and right in the description below mean the left and right in FIG. 15. Members and the like to which reference numerals are not given in the following description are not illustrated in the drawing.

Features of the electromagnetic clutch 301 will be described.

The electromagnetic clutch 301 as an electromagnetic coupling device is accommodated in a housing on a stationary side. The electromagnetic clutch 301 includes a rotor 305 through which magnetic lines of force pass. The electromagnetic clutch 301 includes an electromagnet 317 placed on one side of the rotor 305. The electromagnetic clutch 301 includes an armature 315 which is placed on the other side of the rotor 305, through which magnetic lines of force pass, the magnetic lines being attracted toward the one side. The rotor 305 uses any of the magnetic-path members of the first and second embodiments.

The structure of the electromagnetic clutch 301 will be described.

The electromagnetic clutch 301 includes a driving member 303 made of a non-magnetic material. The electromagnetic clutch 301 includes the rotor 305 (magnetic-path member of the invention: magnetic-path member manufactured by use of the manufacturing method of the invention) which constitutes a right wall of the driving member 303. The electromagnetic clutch 301 includes a driven member 307, a multi-disc main clutch 309, a ball cam 311, a multi-disc pilot clutch 313, the armature 315, the electromagnet 317, a controller, and the like. The electromagnetic clutch 301 is accommodated in a housing.

The rotor 305 is placed in a rear opening of the driving member 303 and positioned on the driven member 307 by a washer which is subjected to a thrust force. The rotor 305 is an annular member. The rotor 305 includes first and second magnetic members 321 and 323 on the inner and outer peripheral sides, respectively. The rotor 305 includes a non-magnetic portion 325 which connects the magnetic portions 321 and 323 on the inner and outer peripheral sides by heat sintering. The non-magnetic portion 325 has minute spaces inside, similarly to that of the magnetic-path member 101 of the second embodiment does. The non-magnetic portion 325 has, on the left side (pilot clutch 313 side), a depression 327 formed by its own weight in heat sintering. The radial surfaces 328 of end portions of the depression 327 touch the surface of a first inner plate. On the opposite side, the non-magnetic portion 325 has a space 329 formed by regrinding in cutting. The non-magnetic portion 325, the depression 327, and the space 329 are filled with air. These kinds of air magnetically insulate the magnetic portions 321 and 323 from each other with their own magnetoresistances, and effectively prevent magnetic short circuits therebetween.

The left end of the driven member 307 is movably supported by the housing using a ball bearing. The right end of the driven member 307 is movably supported by the housing using a ball bearing 331 and the electromagnet 317. The main clutch 309 is placed between the driving member 303 and the driven member 307.

The ball cam 311 is placed between a pressure plate 333 and a cam ring 335. The pressure plate 333 is splined to the driven member 307. The cam ring 335 is movably supported by the outside of the driven member 307 so as to be rotatable relatively thereto. The cam ring 335 and the rotor 305 have a bearing 336 which is placed therebetween and subjected to the reaction force (thrust force) of the ball cam 311.

The pilot clutch 313 is placed between the driving member 303 and the cam ring 335. The pilot clutch 313 includes outer plates splined to the inside of the driving member 303. The pilot clutch 313 includes inner plates splined to the outside of the cam ring 335. The armature 315 is placed between the pilot clutch 313 and the pressure plate 333 so as to be movable in the axial direction.

The electromagnet 317 is placed to be adjacent to the rotor 317 with an appropriate air gap interposed therebetween, and is supported by the housing. Lead wires of the electromagnet 317 are led to the outside of the housing through a grommet and connected to a battery through the controller.

The electromagnetic clutch is of an open type. The housing accommodating the electromagnetic clutch has an oil chamber. This oil flows into and from the electromagnetic clutch to lubricate and cool the inside thereof. The minute spaces in the non-magnetic portion 325 of the rotor 305 hold this oil or allow this oil to flow between the inside and outside in the axial direction.

As described above, the non-magnetic portion 325 magnetically insulates the inner and outer-peripheral side magnetic portions 321 and 323 from each other in the rotor 305. Each plate of the pilot clutch 313 has cut-out portions and bridge portions at radial positions corresponding to the non-magnetic portion 325. The cut-out portions are provided to be equally spaced in the circumference direction, and the bridge portions connect these cut-out portions. The non-magnetic portion 325 and the cut-out portions prevent a magnetic flux from shortening on a magnetic path.

The air gap, the rotor 305, the pilot clutch 313, and the armature 315 constitute a magnetic path for the electromagnet 317. The controller performs the energization of the electromagnet 317, the control of an exciting current, the stopping of energization, and the like.

When the electromagnet 317 is energized, magnetic lines 337 of force are produced in a magnetic path. The electromagnet 317 attracts the armature 315 to engage the pilot clutch 313. Under the thrust force produced by the actuation of the ball cam 311, the main clutch 309 is pressed and engaged using the pressure plate 333. This operation connects the electromagnetic clutch 301 and transmits the driving force of an engine from the driving member 303 to the driven member 307.

Benefits of the electromagnetic clutch 301 will be described.

The non-magnetic portion 325 formed by heat sintering couples the magnetic portions 321 and 323 of the rotor 305 and magnetically insulates the magnetic portions 321 and 323 from each other. This magnetic insulation effectively prevents short circuits between the magnetic lines 337 of force of the electromagnet 317, ensures stable characteristics of a magnetic path, and achieves stable operation and excellent operating response.

Heat sintering gives minute spaces to the non-magnetic portion 325. The non-magnetic portion 325 allows the rotor 305 to be used as a side wall member of the electromagnetic clutch 301 of an open type as described previously.

The rotor 305 achieves effects similar to those of the magnetic-path member 101 of the second embodiment and is mass-produced at a low cost. Accordingly, the electromagnetic clutch 301 is also manufactured at a low cost.

The minute spaces containing air improve cushioning against the plates of the pilot clutch 313. The minute spaces containing oil improve cooling and lubricity.

Other aspects included in the scope of the invention will be described.

As described previously, the magnetic-path member of the invention is applied to an electromagnetic clutch, an electromagnetic brake, an electromagnetic coupling, or the like, which are electromagnetic coupling devices. The magnetic-path member may be applied to a device of a hermetic type or an open type by adjusting whether minute spaces exist or not, whether minute spaces are independent of each other or connected to each other, and the like.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According to the invention, with reference to FIG. 1, a magnetic-path member 1 includes annular first and second magnetic-path elements (3, 5) on radially inside and outside thereof. The magnetic-path member 1 includes an annular magnetic-reluctance element 7 between the first and second magnetic-path elements 3 and 5. The magnetic-reluctance element 7 is magnetized less than the first and second magnetic-path elements 3 and 5. A magnetic circuit MC includes first and second magnetic-paths (P1, P2) oppositely passing through the first and second magnetic-path elements (3, 5) in the width directions respectively. The magnetic-reluctance element (7) magnetically separates the first and second magnetic-paths (P1, P2) from each other.

What is claimed is:

1. A magnetic path member comprising:
   a first magnetic portion made of a magnetic material and formed in an annular shape symmetrical about an axis;
   a second magnetic portion made of a magnetic material surrounding the first magnetic portion so as to have the axis in common with the first magnetic portion and leave an annular gap to magnetically separate the first magnetic portion and the second magnetic portion;
   a first surface formed and shared by surfaces of the first magnetic portion and the second magnetic portion;
   a second surface formed and shared by other surfaces of the first magnetic portion and the second magnetic portion, said second surface opposed to the first surface; and
   a non-magnetic portion made of a sintered non-magnetic material and filled in the annular gap to structurally couple the first magnetic portion with the second magnetic portion, said non-magnetic portion having a depression receding from the first surface into the annular gap and a receding surface opposite to the depression so as to leave a space between the receding surface and the second surface.

2. The flux path member according to claim 1, wherein the non-magnetic portion includes a sintered portion formed by sintering of a powder of the non-magnetic material and the depression is inherently formed in the course of the sintering.

3. The flux path member according to claim 1, wherein the non-magnetic material is one selected from the group of copper, aluminum, and stainless steel.

4. An electromagnet coupling device comprising:
   a rotor which magnetism is capable of permeating;
   an electromagnet positioned on one side of the rotor;
   an armature positioned on the opposite side of the rotor to be attracted toward the electromagnet by the magnetism permeating the rotor; and
   a magnetic path member according to claim 1 included in one selected from the group of the rotor and the armature.

* * * * *